US012630903B2

(12) United States Patent
Tsuruta

(10) Patent No.: US 12,630,903 B2
(45) Date of Patent: May 19, 2026

(54) ELECTRICALLY-CONDUCTIVE MATERIAL HAVING EXCELLENT WEAR RESISTANCE AND HEAT RESISTANCE

(71) Applicant: TANAKA KIKINZOKU KOGYO K.K., Tokyo (JP)

(72) Inventor: Terumasa Tsuruta, Tomioka (JP)

(73) Assignee: TANAKA PRECIOUS METAL TECHNOLOGIES Co., Ltd., Tokyo (JP)

( * ) Notice: Subject to any disclaimer, the term of this patent is extended or adjusted under 35 U.S.C. 154(b) by 210 days.

(21) Appl. No.: 18/442,092

(22) Filed: Feb. 14, 2024

(65) Prior Publication Data

US 2024/0183008 A1 Jun. 6, 2024

Related U.S. Application Data

(62) Division of application No. 17/298,425, filed as application No. PCT/JP2019/045935 on Nov. 25, 2019, now Pat. No. 11,939,653.

(30) Foreign Application Priority Data

Nov. 30, 2018 (JP) ................................ 2018-224339

(51) Int. Cl.
*C22C 5/04* (2006.01)
*C22C 5/00* (2006.01)
(Continued)

(52) U.S. Cl.
CPC .................. *C22C 5/04* (2013.01); *C22C 5/00* (2013.01); *C22C 5/06* (2013.01); *C22C 9/06* (2013.01);
(Continued)

(58) Field of Classification Search
CPC .... C22C 5/04; C22C 5/00; C22C 5/06; C22C 9/06; C22C 19/03; H01B 1/02; H01B 13/00; H02K 13/00
See application file for complete search history.

(56) References Cited

U.S. PATENT DOCUMENTS

2003/0061903 A1 4/2003 Nakamura et al.
2019/0139721 A1 5/2019 Niitsuma et al.
2019/0345583 A1 11/2019 Asada et al.

FOREIGN PATENT DOCUMENTS

CN 102290116 A * 12/2011
CN 104726742 A * 6/2015
(Continued)

OTHER PUBLICATIONS

English translation of CN 102290116 A, accessed Nov. 5, 2025 via Espacenet <https://worldwide.espacenet.com/patent/search/family/045336444/publication/CN102290116A?q=CN%20102290116%20A> (Year: 2011).*
(Continued)

*Primary Examiner* — Jeremy A Luks
(74) *Attorney, Agent, or Firm* — Foley & Lardner LLP

(57) ABSTRACT

An electrically-conductive material containing Ag in an amount of 10 mass % or more and 70 mass % or less, Pd in an amount of 30 mass % or more and 90 mass % or less, Ni in an amount of more than 5 mass % and 45 mass % or less, and inevitable impurities. A ratio of a Ni content (mass %) to a Ag content (mass %) (Ni (mass %)/Ag (mass %)) is 0.1 or more and 5.0 or less, metal structures include a AgPd alloy phase and a PdNi alloy phase, and a volume ratio of the PdNi alloy phase is 18 vol % or more and 80 vol % or less. Ni is added in a high concentration to a AgPd alloy, and the amount of PdNi alloy phases generated as separate phases is controlled to strengthen the entire alloy.

5 Claims, 9 Drawing Sheets

(51) Int. Cl.

| | |
|---|---|
| ***C22C 5/06*** | (2006.01) |
| ***C22C 9/06*** | (2006.01) |
| ***C22C 19/03*** | (2006.01) |
| ***H01B 1/02*** | (2006.01) |
| ***H01B 13/00*** | (2006.01) |
| ***H02K 13/00*** | (2006.01) |

(52) U.S. Cl.

CPC ............... *C22C 19/03* (2013.01); *H01B 1/02* (2013.01); *H01B 13/00* (2013.01); *H02K 13/00* (2013.01)

(56) References Cited

FOREIGN PATENT DOCUMENTS

| | | | | | |
|---|---|---|---|---|---|
| EP | 1 496 573 | A1 | | 1/2005 | |
| JP | S60-17034 | A | | 1/1985 | |
| JP | S60-138877 | A | | 7/1985 | |
| JP | S62-60457 | B2 | | 12/1987 | |
| JP | S62-60458 | B2 | | 12/1987 | |
| JP | H03-51262 | B2 | | 8/1991 | |
| JP | H06-49562 | A | | 2/1994 | |
| JP | 2002-042594 | A | | 2/2002 | |
| JP | 2004-183077 | A | | 7/2004 | |
| KR | 20160127199 | A | * | 11/2016 | ............ H01R 39/24 |
| WO | WO-2013069689 | A1 | * | 5/2013 | ............... C25D 3/62 |
| WO | WO-2017/130781 | A1 | | 8/2017 | |
| WO | WO-2017/204129 | A1 | | 11/2017 | |

OTHER PUBLICATIONS

Internet Archive of Wikipedia page for Commutator (electric), archive date Nov. 15, 2017 (Year: 2017).*

English translation of JP 03-051262 (Year: 1991).*

International Searching Authority, "International Search Report," issued in connection with International Patent Application No. PCT/JP2019/045935, dated Feb. 25, 2020.

International Searching Authority, "Written Opinion," issued in connection with International Patent Application No. PCT/JP2019/045935, dated Feb. 25, 2020.

Extended European Search Report issued in corresponding European Patent Application No. 19889277.0 dated Feb. 11, 2022.

* cited by examiner

COMPARATIVE EXAMPLE 1 : Ag62Pd36Ni2
700°C
COMPARATIVE EXAMPLE 2 : Ag59Pd37Ni4
700°C
COMPARATIVE EXAMPLE 5 : Ag7Pd61Ni32
900°C
CONVENTIONAL EXAMPLE 1 : AgPd50
700°C
CONVENTIONAL EXAMPLE 2 : AgPd30Ni1
600°C
CONVENTIONAL EXAMPLE 3 : AgPd30Ni1In2
700°C
CONVENTIONAL EXAMPLE 4 : AgPd50Ni1In1
700°C
SURFACE HARDNESS (Hv)
400 350 300 250 200 150 100 50
HEAT TREATMENT TEMPERATURE (°C)
400 500 600 700 800 900 1000

ELECTRICALLY-CONDUCTIVE MATERIAL HAVING EXCELLENT WEAR RESISTANCE AND HEAT RESISTANCE

CROSS-REFERENCE TO RELATED APPLICATIONS

This application is a divisional of U.S. patent application Ser. No. 17/298,425, filed on May 28, 2021, which is a U.S. National Phase of International Patent Application No. PCT/JP2019/045935, filed Nov. 25, 2019, which claims priority to and the benefit of Japanese Patent Application No. 2018-224339, filed on Nov. 30, 2018. The contents of these applications are hereby incorporated by reference in their entireties.

TECHNICAL FIELD

The present invention relates to an electrically-conductive material including a metal alloy, which is used for transmitting currents from stationary components to movable components at electrical contact areas of motors such as DC motors and micro DC motors, variable resistors such as slide switches and potentiometers, connectors such as slip rings, and the like.

BACKGROUND ART

As electrically-conductive materials that are used in the above-mentioned fields, AgPd alloys (AgPd alloys containing Ag in an amount of 30 to 70 mass %, particularly 50 mass %). AgPd alloys have excellent corrosion resistance, and low contact resistance which is a property advantageous for electrically-conductive materials. In addition, AgPd alloys are complete solid solution type alloys, have a face-centered cubic lattice, relatively easily plastically deform, and have good processability.

Electrically-conductive materials that are applied to the above-mentioned various variable resistors, motors, connectors and the like are required to have both wear resistance and heat resistance for securing long-term stable electrical contact during sliding. AgPd alloys have been heretofore considered as materials capable of meeting such requirements. Recently, however, in use modes of electrically-conductive materials, loads such as sliding speeds, input power and contact loads have increased, so that the electrically-conductive materials have been required to have higher durability. AgPd alloys are being pointed out to have a problem concerning durability against such increasing loads.

At the outermost surface of an electrically-conductive material in a slide contact state, the electrically-conductive material is plastically deformed due to sliding stress, resulting in formation of an altered layer in which metal structures are minutely agitated. In addition, electrically-conductive materials that are used under high-speed rotation conditions of several hundreds to several tens of thousands of rpm in motors, slip rings and the like, or conditions which cause arc discharge with a current-applying power of 10 W or more are affected by friction heat from rotation or heat from arc discharge. At the outermost surface of an electrically-conductive material, metal structures are altered by the impact of such heat as well. FIG. 10 shows results of observing a state in which an altered layer is formed on the outermost surface of a slide member containing a AgPd alloy after practical use. As shown in FIG. 10, an altered layer resulting from plastic deformation or the impact of heat can be confirmed to exist over a range of about 10 μm from the outermost surface of an electrically-conductive material.

Wear of the slide member containing an electrically-conductive material occurs because the altered layer portion on the surface of the material cannot endure an external force such as sliding stress or arc energy, and falls off as worn powder. In view of such a wear mechanism, it is required to improve both the wear resistance and the heat resistance of an electrically-conductive material that forms the slide member.

For the electrically-conductive material to have improved wear resistance and heat resistance, the electrically-conductive material should be a material in which the rigidity modulus is so high that deformation hardly occurs even when shear stress is applied due to sliding and in which recrystallization hardly occurs even when heat energy is applied. Improvement of these properties in the electrically-conductive material is extremely important for extending the life of the slide member. Here, as an approach for improving the wear resistance and the heat resistance of a conventional electrically-conductive material containing a AgPd alloy, a method is known in which a very small amount of additive elements are added to the alloy to provide crystal grain refining and precipitation strengthening As a method for crystal grain refining of the AgPd alloy with a very small amount of additive elements, a method has been disclosed in which Ni, Fe and Co are added in an amount of 3 mass % or less (Patent Document 1). When a very small amount of these elements are added to the AgPd alloy, micro-grains of PdFe, PdNi and PdCo grow at grain boundaries of a AgPd matrix, so that crystal grains of the matrix are micronized. Consequently, improvement of the strength property of the material and prevention of softening of the surface of the material during sliding can be hoped.

As a method for improving the properties of the AgPd alloy by precipitation strengthening, a method has been disclosed in which additive elements such as Al, Mn, Ga, In, Sn, Zn and Pb are added in an amount of 1 to 5 mass % (Patent Documents 2 to 4). When these additive elements are added, Pd and an intermetallic compound are generated at grain boundaries of a AgPd matrix. The intermetallic compound has a crystal structure different from that of the AgPd matrix having a face-centered cubic lattice, has high strength, hence hardly deforms, and exhibits an improving effect on the rigidity modulus of the alloy.

RELATED ART DOCUMENT

Patent Documents

Patent Document 1: WO 2017/130781 A1
Patent Document 2: JP H3-051262 B
Patent Document 3: JP S62-060458 B
Patent Document 4: JP S62-060457 B

SUMMARY OF THE INVENTION

Problems to be Solved by the Invention

The crystal grain refining and precipitation strengthening with a very small amount of additive elements are effective to a certain degree in improvement of wear resistance and heat resistance of a Ag alloy. However, given that the slide member is exposed to a more harsh use environment, it is difficult to say that a sufficient effect can be obtained.

That is, the crystal grain refining with a very small amount of additive elements increases the values of maximum stress and yield strength, but cannot cause a significant change for improvement of the rigidity modulus and the recrystallization temperature. This method is insufficient for reforming a material.

In addition, precipitation strengthening with an intermetallic compound is more effective in material strengthening than the crystal grain refining. The intermetallic compound precipitated with the elements exemplified above is generated depending on an alloy composition (blending ratio of additive elements). When the blending ratio of additive elements is increased, the precipitation amount of the intermetallic compound increases to enhance the effect of precipitation strengthening, but processability is deteriorated, so that it is difficult to produce the slide member. On the other hand, at a blending ratio which ensures that processability is adversely affected, the improving effect on material properties is insufficient, and the life of the electrically-conductive material cannot be extended. That is, this conventional art does not allow the precipitation to be adjusted easily. In addition, the intermetallic compound developed here is precipitated by a mechanism different from age precipitation by spinodal decomposition or the like, and therefore control of the grain size is also difficult. Thus, there is a limit on improving wear resistance and heat resistance while securing processability.

The present invention has been made against the background of the above circumstances, and discloses an electrically-conductive material based on a AgPd alloy, which has a superior rigidity modulus and recrystallization property over the conventional art while maintaining processability. An object of the present invention is to provide an electrically-conductive material having excellent wear resistance and heat resistance even at an electrical contact portion which is placed under large mechanical and electrical loads.

Means for Solving the Problems

For achieving the above-described object, the present invention provides an electrically-conductive material containing Ag in an amount of 10 mass % or more and 70 mass % or less, Pd in an amount of 30 mass % or more and 90 mass % or less, Ni in an amount of more than 5 mass % and 45 mass % or less, and inevitable impurities. A ratio of a Ni content (mass %) to a Ag content (mass %) (Ni (mass %)/Ag (mass %)) is 0.1 or more and 5.0 or less, metal structures include a AgPd alloy phase and a PdNi alloy phase, and a volume ratio of the PdNi alloy phase is 18 vol % or more and 80 vol % or less.

In the method including strengthening a material by crystal grain refining of a AgPd matrix (Patent Document 1) in the conventional art described above, the added amount of Ni is limited within a very small amount range (3 mass % or less). The limitation of the amount of elements added is aimed at providing crystal grain refining while a difference in solid solubility between the metals of Ag, Pd and Ni is taken into consideration. That is, Pd can be completely solid-dissolved with Ag to form of an alloy (AgPd). On the other hand, Ni is hardly solid-dissolved with Ag, but can be completely solid-dissolved with Pd to form an alloy (PdNi). It is thought preferable for crystal grain refining of the AgPd alloy by addition of Ni to proceed with a separation phase (PdNi) in the matrix as an origination point, and to disperse fine separation phases. When the added amount of Ni which is hardly solid-dissolved with Ag that forms the matrix is large, coarse separate phases are excessively generated, resulting in hindrance to crystal grain refining. Thus, in the above-described conventional art, limiting the added amount of Ni to a very small amount to disperse fine separate phases in a homogeneous AgPd alloy matrix to thereby provide crystal grain refining.

In contrast to the conventional art, Ni in a high concentration range is intentionally added to the AgPd alloy in the electrically-conductive material according to the present invention. As described above, Ni is an element which is hardly solid-dissolved with Ag, but can be completely solid-dissolved with Pd. Studies by the present inventors show that the PdNi alloy phase which is a separate phase generated by addition of Ni can strengthen the entire alloy when the amount of the PdNi alloy phase with respect to the matrix (AgPd alloy) is appropriately controlled.

The present inventors have found that strengthening of a material with the PdNi alloy phase is effective for enhancement of the rigidity modulus in addition to improvement of maximum stress and yield strength. Further, it has been confirmed that appropriate control of the amount of the PdNi alloy phase improves the recrystallization temperature, and is effective for improvement of the heat resistance of the alloy.

The AgPd alloy containing an appropriate amount of Ni according to the present invention also has processability. This effect is based on the fact that the PdNi alloy phase given attention in the present invention has higher deformability as compared to intermetallic compounds for precipitation strengthening as described above (Patent Documents 2 to 4). The PdNi alloy phase has a face-centered cubic lattice like the AgPd alloy as a matrix, and tends to deform together with the matrix when the entire alloy plastically deforms. When the amount of the PdNi alloy phase in the alloy is within an appropriate range, processability can be secured.

As described above, the present invention is characterized in that Ni as an additive element is added with a relatively high concentration to a AgPd alloy to form a multiphase alloy in which AgPd alloy phases are combined with PdNi alloy phases. That is, the electrically-conductive material according to the present invention has characteristics based on an alloy composition including a Ni content and the like, and characteristics based on metal structures related to a multiphase alloy. Hereinafter, a component composition and metal structures will be described in detail with regard to a configuration of the electrically-conductive material according to the present invention.

A. Alloy Composition of Electrically-Conductive Material of the Invention

The electrically-conductive material according to the present invention includes a AgPdNi alloy having three elements of Ag, Pd and Ni as essential constituent elements. The composition range of the AgPdNi alloy is set Ag: 10 mass % or more and 70 mass % or less; Pd: 30 mass % or more and 90 mass % or less; and Ni: more than 5 mass % and 45 mass % or less.

The present invention places a restriction on the blending ratio of Ni and Ag in the AgPdNi alloy having a composition in the above-described range. Specifically, the ratio of the Ni content (mass %) and the Ag content (mass %) (Ni (mass %)/Ag (mass %)) is in the range of 0.1 or more and 5.0 or less.

In this way, the composition of the AgPdNi alloy applied in the present invention is set within the above-described range, and further, the blending ratio of Ni and Ag is specified. This is aimed at evenly dispersing AgPd alloy phases and PdNi alloy phases to obtain a AgPdNi alloy of preferred metal structures required in the present invention. Essentially, AgPd alloy phase and the PdNi alloy phase are not inherently mixed with each other. When there is a significant difference in density in a liquid phase state and solidus temperature between the alloy phases, the separation tendency becomes strong during casting, so that it is difficult to produce a uniform metal ingot.

Studies by the present inventors show that a uniform metal ingot can be obtained by generating AgPd alloy phases and PdNi alloy phases in such a manner that the liquid phase density ratio (liquid phase density of PdNi alloy phase/liquid phase density of AgPd alloy phase) is in the range of 0.95 to 1.00 and the solidus temperature is less than 100° C. In order to generate the alloy phases meeting the above-mentioned requirements for the AgPdNi alloy, the alloy composition is set within the above-described range, and the blending ratio of the Ni content to the Ag content is specified.

The composition of the AgPd alloy phase generated in accordance with the alloy composition and the blending ratio specified in the present invention is Ag: 30 mass % or more and 80 mass % or less; Ni: 0 mass % or more and 1 mass % or less; and Pd and inevitable impurities: balance. The composition of the PdNi alloy phase is Pd: 40 mass % or more and 90 mass % or less; Ag: 0 mass % or more and 5 mass % or less; and Ni and inevitable impurities: the balance. The inevitable impurities contained in each of the alloy phases include inevitable impurities of the electrically-conductive material according to the present invention as described later, and the content of the latter impurities is within a range as described later. The compositions of the AgPd alloy phase and the PdNi alloy phase can be measured by elemental analysis based on spectroscopy such as wavelength dispersive X-ray spectroscopy (WDS) at the time when the metal structures of the AgPdNi alloy are observed with a scanning electron microscope (SEM) or the like.

When regarding the alloy composition described above, the contents of Ag, Pd and Ni are outside the above-described ranges, or the blending ratio of the Ni content and the Ag content is outside the above-described range, the above-described preferred AgPd alloy phase and PdNi alloy phase are not generated at a preferred volume ratio, and it is difficult to produce a homogeneous and uniform material. In addition, it is also difficult to secure wear resistance as an electrically-conductive material, which is an object to be achieved by the present invention.

The alloy composition of the AgPdNi alloy applied in the present invention is Ag: 14 mass % or more and 55 mass % or less; Pd: 38 mass % or more and 60 mass % or less; and Ni: more than 5 mass % and 30 mass % or less. The ratio of the Ni content (mass %) to the Ag content (mass %) is preferably 0.1 or more and 2.5 or less. More preferably, the composition is Ag: 30 mass % or more and 43 mass % or less, Pd: 45 mass % or more and 50 mass % or less; and Ni: more than 12 mass % and 20 mass % or less. In addition, it is more preferable that the ratio of the Ni content (mass %) to the Ag content (mass %) is 0.3 or more and 0.7 or less.

As described above, the electrically-conductive material according to the present invention has Ag, Pd and Ni as essential constituent elements. This alloy can possibly contain Fe, Co, Cr, Mn, Mg, Al, Zn, Cu, Si, S, As, Sn, In and the like as inevitable impurities. The inevitable impurities can be contained in a total amount of 0.5 mass % or less. These inevitable impurities can be solid-dissolved with one or both of the AgPd alloy phase and the PdNi alloy phase. In addition, these inevitable impurities may form a compound with one of Ag, Pd and Ni, and precipitate without having an impact in the alloy. Further, the present inventive electrically-conductive material can possibly contain C (carbon) in an amount of 0 ppm or more and 100 ppm or less, and O (oxygen) and N (nitrogen) in a total amount of 0 ppm or more and 200 ppm or less, in addition to the above-described inevitable impurities.

B. Metal Structures of Electrically-Conductive Material of the Invention

The AgPdNi alloy that forms the electrically-conductive material according to the present invention has the above-described alloy composition, and metal structures in which AgPd alloy phases are combined with PdNi alloy phases. This is aimed at imparting wear resistance and heat resistance to a conventional AgPd alloy. In the AgPdNi alloy according to the present invention, the volume ratio of the PdNi alloy phase is in the range of 18 vol % or more and 80 vol % or less. When the volume ratio of the PdNi alloy phase is less than 18 vol %, wear resistance or the like required as an electrically-conductive material is insufficient. On the other hand, when the volume ratio of the PdNi alloy phase is more than 80 vol %, processability is deteriorated, so that it is difficult to process the member into a desired shape.

The volume ratio of the PdNi alloy phase is a volume ratio of the PdNi alloy phase in the electrically-conductive material (AgPdNi alloy). As described later, the volume ratio of the PdNi alloy phase is approximated by an area ratio of the PdNi alloy phase in an observation region of an arbitrary cross-section observed. The compositions of the AgPd alloy phase and the PdNi alloy phase observed in the metal structures are as described above.

The AgPdNi alloy of the present invention in which the volume ratio of the PdNi alloy is in the above-described range can be cast while the composition of the entire alloy and the ratio of the Ni content to the Ag content are set within the above-described ranges. By plastically processing the cast alloy material, a AgPdNi alloy can be obtained which has metal structures in which layered AgPd alloy phases and/or PdNi alloy phases are distributed on an arbitrary cross-section. By forming such metal structures, the properties of the alloy phases can be exhibited in a synergistic manner, so that high wear resistance and heat resistance can be exhibited.

In the present invention, the arbitrary cross-section refers to one or more arbitrarily selected processing-direction cross-sections. The processing-direction cross-section is a cross-section parallel to a processing direction. Typically, the processing direction may be a direction in which the AgPd alloy phase and/or the PdNi alloy phase extend. In the present invention, the metal structures are observed over the entire arbitrarily selected processing-direction cross-section. In the present invention, the layered PdNi alloy phases (AgPd alloy phases) are formed by continuous distribution of a plurality of PdNi alloy phases (AgPd alloy phases) extending in a processing direction in metal structures on an arbitrary cross-section, where the PdNi alloy phases (AgPd alloy phases) are layered from the standpoint of appearance. However, the term “layered” is not limited to a state in which PdNi alloy phases (AgPd alloy phases) are continuous over the entire area, and there may be one or more isolated portions.

The metal structures of the AgPdNi alloy that form the electrically-conductive material according to the present invention have an appearance related a volume ratio of PdNi alloy phases. A AgPdNi alloy in which the volume ratio of PdNi alloy phases is relatively low, specifically 18 vol % or more and less than 50 vol % has metal structures in which AgPd alloy phases, and PdNi alloy phases each having a thickness smaller than that of the AgPd alloy phase are distributed. Here, the thickness of the PdNi alloy phases is within the range of 0.01 μm to 20 μm. On the other hand, a AgPdNi alloy in which the volume ratio of PdNi alloy phases is relatively high, specifically 50 vol % or more and 80 vol % or less has metal structures in which PdNi alloy phases, and AgPd alloy phases each having a thickness smaller than that of the PdNi alloy phase are distributed. Here, the thickness of the AgPd alloy phases is within the range of 0.01 μm to 20 μm.

In particular, an alloy in which the volume ratio of PdNi alloy phases is 35 vol % or more and 65 vol % or less has metal structures in which continuous layered AgPd alloy phases and/or PdNi alloy phases are laminated. In the AgPdNi alloy having laminated structures, AgPd alloy phases or PdNi alloy phases having a thickness within the range of 0.01 μm to 20 μm are distributed depending on the volume ratio of PdNi alloy phases. The above-described thickness of the PdNi alloy phase (AgPd alloy phase) is the width of the alloy phase in a direction crossing the processing direction. In the present invention, it is necessary that all the PdNi alloy phases (AgPd alloy phases) observed on an arbitrary cross-section have a thickness within the above-described range.

The metal structures of the AgPdNi alloy of the present invention can be observed by use of a common method for observing a metal. However, the cross-section to be observed is a processing-direction cross-section. The processing-direction cross-section is a cross-section parallel to a processing direction as described above, and on the cross-section, crystals extend in a lateral axis direction. In measurement of the volume ratio of PdNi alloy phases, and the thickness of each alloy phase, measurement and calculation are performed on the basis of metal structures on the observed processing-direction cross-section.

The metal structures can be observed with an optical microscope or a scanning electron microscope (e.g. SEM), and may be appropriately etched as pretreatment for observation. By observing the metal structures, whether laminated constitutional structures are present or not can be determined, and the volume ratio of PdNi alloy phases, and the thickness of each phase can be measured. Here, the volume ratio of PdNi alloy phases can be approximated by an area ratio to an observation region which is calculated by image processing. For the image processing, software can be used as appropriate. For example, by properly setting a threshold and binarizing image data for an image of metal structures photographed by the above-described observation method, calculation of the area ratio (volume ratio) of PdNi alloy phases and measurement of the thickness of the alloy phase can be performed. Preferably, such image analysis is performed in a plurality of visual fields (three or more visual fields), and an average value of the results obtained is employed.

C. Strength and Thermal Properties of Electrically-Conductive Material of the Invention In the electrically-conductive material including the above-described AgPdNi alloy according to the present invention, the rigidity modulus and the thermal properties are improved in contrast to the conventional art for securing wear resistance and heat resistance. Specifically, the rigidity modulus is 50 to 100 GPa. It has been confirmed that the electrically-conductive material of the present invention has a higher strength property as compared to a AgPd alloy (e.g. AgPd50) as a conventional art in which the rigidity modulus is about 45 GPa. Owing to the improvement of the strength property, the metal structures of the slide contact portion hardly deforms even when subjected to shear stress from sliding, so that formation of a surface altered layer is suppressed. Thus, improvement of the strength property may contribute to improvement of wear resistance.

The recrystallization temperature of the electrically-conductive material including a AgPdNi alloy according to the present invention is in a higher temperature range as compared to the conventional art. A conventional electrically-conductive material is recrystallized by heat treatment at 700° C. (heating for 30 minutes), leading to coarsening and a decrease in hardness of metal structures. On the other hand, the hardness of the AgPdNi alloy of the present invention does not completely decrease in heat treatment at 700° C. The AgPdNi alloy is recrystallized only when heat energy at 900° C. or higher is applied. Thus, the electrically-conductive material of the present invention is less likely to be affected by friction heat during sliding or heat associated with arc discharge, and has superior heat resistance over the conventional art.

D. Method for Producing Electrically-Conductive Material of the Invention

The present inventive electrically-conductive material including a AgPdNi alloy can be produced fundamentally by the same production process as in the case of a AgPd alloy which is a conventional art. That is, the AgPdNi alloy can be formed by a melting method, and a cast ingot serving as an alloy material can be obtained by a casting method. The cast ingot is produced by applying an inclined casting method, a continuous casting method, a semi-continuous casting method or the like.

By plastically processing the cast ingot, the electrically-conductive material having metal structures including AgPd alloy phases and PdNi alloy phases can be produced. As plastic processing, forge processing, swaging, wire drawing, rolling, extrusion, drawing or the like is applied. Preferably, these processing methods are carried out alone or in combination on the cast ingot to perform plastic processing with a total processing ratio of 80% or more. The processing-direction cross-section of the electrically-conductive material subjected to the plastic processing depends on the processing direction in each processing method (wire drawing direction, rolling direction, or extrusion and drawing direction).

E. Use Mode of Electrically-Conductive Material of the Invention

The above-described present inventive electrically-conductive material containing a AgPdNi alloy is processed into an appropriate shape, and used. The shape and the size of the electrically-conductive material depend on a use thereof, and are not particularly limited.

The present inventive electrically-conductive material may be cladded to an appropriate substrate (base material), and used in the form of a clad combined material. As the base material of the clad combined material, Cu or a Cu alloy having excellent electrical conductivity can be applied. Examples of the Cu alloy include Corson copper alloys (Cu: 1 to 4 mass %, Ni: 1 mass % or less, and Si and other elements such as Zn, Mn, Sn and Mg: 1 mass %), beryllium copper alloys (Cu: 2 mass % or less, Be: 1 mass % or less, and Ni, Co, Fe and other elements such as Zn, Mn, Sn and Mg: 0.5 mass % or less), and phosphor bronze alloys (Cu: 1 to 10 mass %, Sn-1: 1 mass % or less, and P and other elements such as Zn, Mn and Mg: 0.5 mass % or less). The form in which the present inventive electrically-conductive material is cladded to a base material may be any of inlay, overlay, edgelay and toplay.

Use of the present inventive electrically-conductive material for a slide contact member can be expected to improve the durability of the member. Specific examples of applications of the slide contact member include use as a brush for DC motors and slip rings. In particular, the present invention is effective in DC motors having a stall current of 1 A or more, and slip rings having an increased rotation speed. In the electric devices having increased power and an increased rotation speed, the brush material may be abraded, and spark-damaged by arc discharge. The present invention enables improvement of the durability life of the slide contact because of superior durability against the wear and damage over the conventional art.

FIG. 1 schematically shows an example of a structure of a DC motor which is a specific application of the present inventive electrically-conductive material (front view and side view). The DC motor includes a rotating shaft, a commutator provided on the periphery of the rotating shaft, and a brush contacting the commutator to supply a current, each of which is an essential constituent member. In the DC motor of FIG. 1, the current from a power source passes through the brush into the commutator to feed a winding coil. When the winding coil is supplied with the current to generate a magnetic field, a magnetized rotor repels and attracts each pole of a permanent magnet to rotate the rotating shaft. Examples of the method for controlling the motor include a resistance control method (FIG. 2(*a*)] and a pulse control method (FIG. 2(*b*)) as shown in FIG. 2. In the former method, a voltage controller such as a power transistor/variable resistor etc. is placed between the motor and the power source, and power supplied to the motor is adjusted to control the rotation speed of the motor. In the latter method, the rotation speed of the motor is controlled while the power source of the motor is turned on and off by use of a switching element such as a control transistor.

In the DC motor described above, the brush is formed of a first contact material at least at a contact surface with the commutator. Here, the present inventive electrically-conductive material is applied as the first contact material. The composition and the metal structures of the electrically-conductive material are as described above.

In the DC motor, the commutator which is a counterpart member for the brush is formed of a second contact material at least at a contact surface with the brush. When the present inventive electrically-conductive material is applied to the first contact material of the brush of the DC motor, a material having a high electrical conductivity (IACS: 55% or more, such as a Ag—Ni alloy, a Ag—Cu—Ni alloy or a Ag—Cu—Ni—Zn alloy is suitable for the second contact material of the commutator. This is because stable electrical contact can be maintained by keeping contact resistance low.

The first contact material of the brush and the second contact material of the commutator may form at least the respective contact surfaces. For example, as in FIG. 3, the members may be formed of combined materials having the first and second contact materials cladded on the respective contact surface sides. The entire member may be formed of the first and second contact materials. The above-described motor structure, control method and the like are also applied to micro DC motors.

The present invention is useful as various electrode materials and contact materials in addition to the above-described applications. Examples of the applications include use for slide switches, connectors, variable resistors such as potentiometers.

Advantageous Effects of the Invention

As described above, the present inventive electrically-conductive material containing a AgPdNi alloy according to the present invention has Ni added to a AgPd alloy in an amount which has not been covered in the conventional art, and includes combined metal structures containing AgPd alloy phases and PdNi alloy phases. The present inventive electrically-conductive material is based on ideas different from those of the conventional art as described above, and thus have excellent wear resistance and heat resistance.

DESCRIPTION OF EMBODIMENTS

Figure 1:
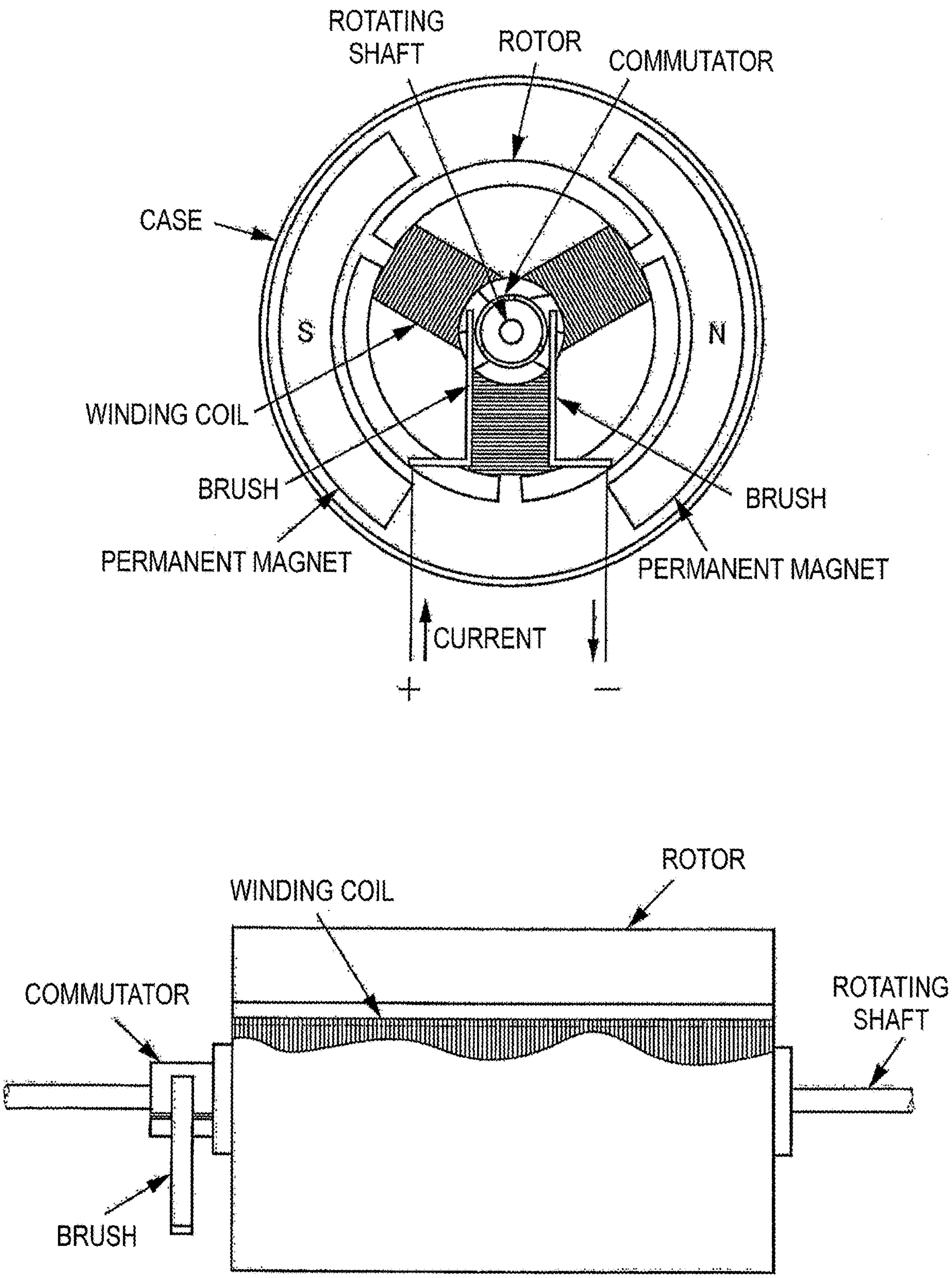
FIG. 1 is schematic diagram illustrating an example of a structure of a DC motor.
Figure 2:
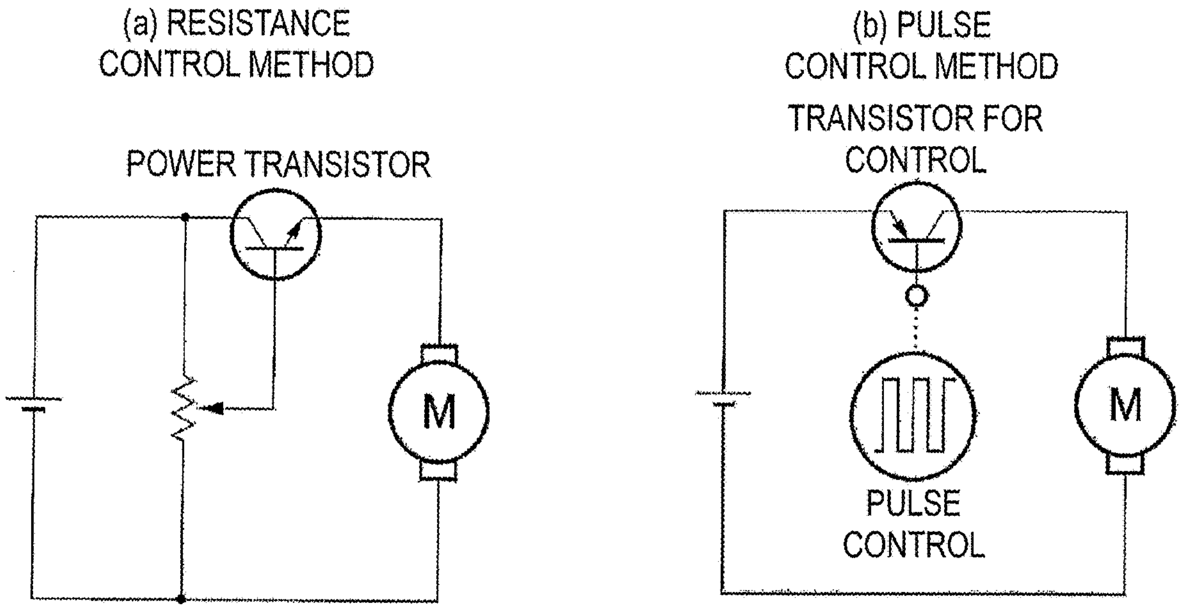
FIG. 2 illustrates a method for controlling the DC motor.
Figure 3:
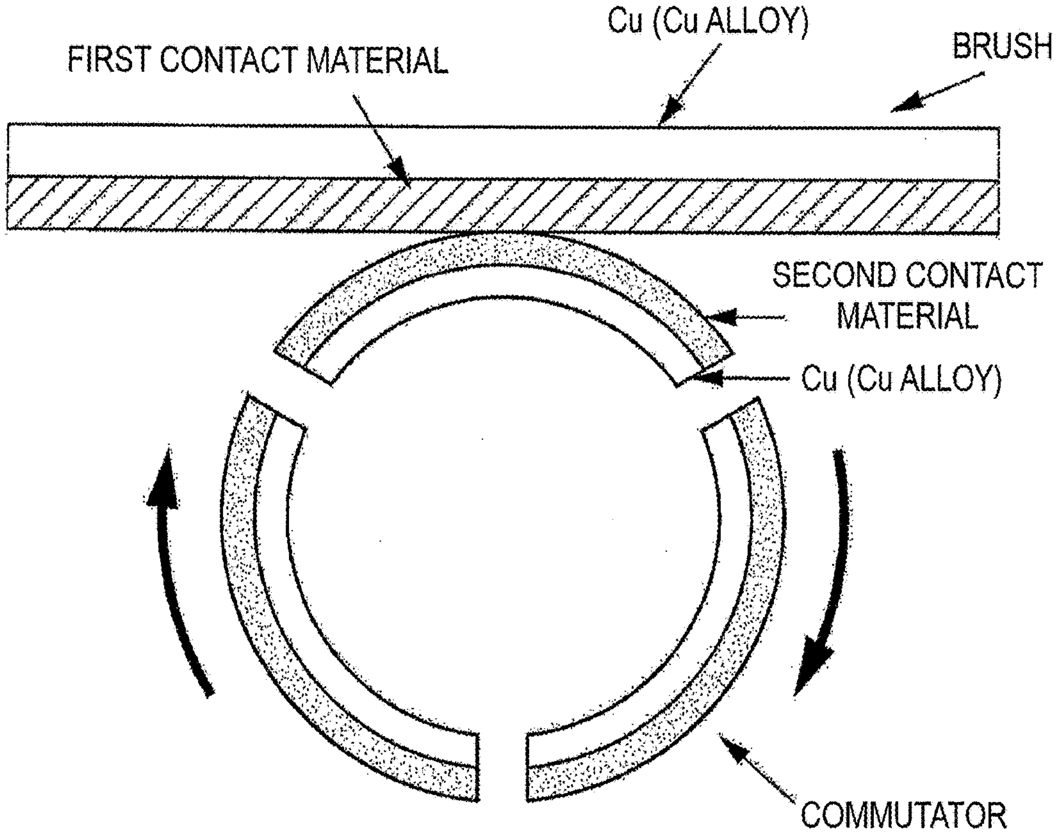
FIG. 3 illustrates a contact state of a brush and a commutator in the DC motor, and configurations of members.

Hereinafter, an embodiment of the present invention will be described. In the embodiment, AgPdNi alloys of various compositions were produced, the metal structures of the alloys were observed, and material properties were evaluated.

A plated-shaped alloy ingot was prepared by a high-frequency melting method and a casting method, and rolled with a total processing ratio of 80% or more to produce a test material of AgPdNi alloy (test material size: 200 mm in length, 10 mm in width and 0.3 mm in thickness) Test materials of AgPd alloy and AgPd-based alloy as the conventional art were produced by the same process.

The metal structures of the produced test materials of AgPdNi alloy and conventional alloys were observed. For observation of the structures, a cross-section parallel to a processing direction was observed by SEM observation. For SEM observation, reflected electron images were photographed at an accelerating voltage of 7 kv and a magnification of 5000 times with JSM-7200F manufactured by JEOL Ltd.

In parallel to the SEM observation, the compositions of a AgPd alloy phase and a PdNi alloy phase were analyzed by WDS for the AgPdNi alloy test material. From this analysis, it was confirmed that in all the AgPdNi alloy test materials, the composition of the AgPd alloy phase was Ag: 65±3 mass %, Pd: 35±3 mass % and Ni: 0.1 mass % or less, and the composition of the PdNi alloy phase was Pd: 62±3 mass %; Ni: 37±3 mass %; and Ag: 1 mass % or less.

The SEM photographs taken for the AgPdNi alloy test materials were subjected to image processing, and the volume ratios of PdNi alloy phases in metal structures of the alloys were measured. The image processing was performed by processing the obtained SEM image with image processing software (VK-H1G9 manufactured by KEYENCE CORPORATION). In the image processing, the SEM image was converted into a gray-scaled image, and binarized. In the binarization operation, a density level value of 80 was set to a threshold on the gray-scaled image (the density level values of all pixels range of 0 to 255), portions having a density level value of less than 80 were counted as black (PdNi alloy phases), portions having a density level value of 80 or more were counted as white (AgPd alloy phases), and the area ratios of the alloy phases were calculated. At the same time, the perpendicular ferret diameters of PdNi alloy phases and AgPd alloy phases (ferret diameter in a perpendicular direction in the SEM image) were measured, and average values and maximum thicknesses were obtained. The observation of metal structures and image processing were performed in a total of six observation visual fields selected, and an average value of measured values obtained from the observation and processing was used for evaluation. In the present invention, the volume ratio is approximated by the area ratio. In this way, measurement of the area ratio or the like of PdNi alloy phases in all the six observation visual fields selected enables examination with consideration also given to a width.

Table 1 below shows the compositions the AgPdNi alloys and the conventional alloys (AgPd alloys and the like) produced in the embodiment. Table 1 shows the volume ratios of PdNi alloy phases in various AgPdNi alloys, and the average thicknesses and the maximum thicknesses of PdNi alloy phases or AgPd alloy phases. The alloy phase thickness shown in Table 1 is the thickness of the PdNi alloy phase for AgPdNi alloys having a PdNi alloy phase content of less than 50 vol % (Examples 1 to 3 and Comparative Examples 1 to 4), and the thickness of the AgPd alloy phase for AgPdNi alloys having a PdNi alloy phase content of 50 vol % or more (Examples 4 to 7 and Comparative Example 5).

However, for the AgPdNi alloy of Comparative Example 6 which had an excessively high Ni content, the test material was so heavily damaged during processing that processing was impossible, and thus the volume ratios of alloy phases and the like were not examined. For the AgPdNi alloy of Comparative Example 7 which had an excessively high Pd content, there were no PdNi alloy phases and AgPd alloy phases, and thus the volume ratios of alloy phases and the like were not examined.

Figure 4:
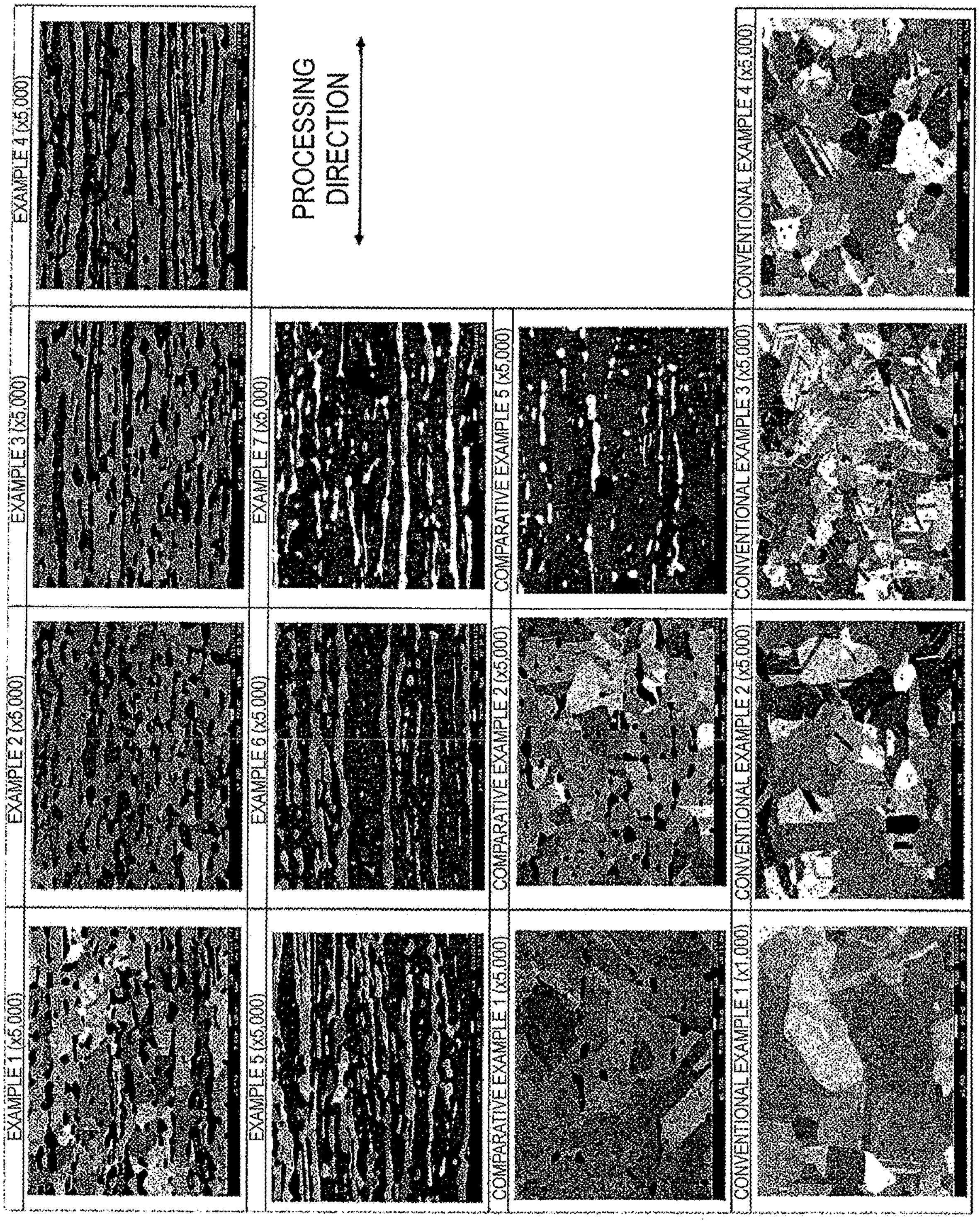
FIG. 4 shows SEM photographs showing metal structures of electrically-conductive materials (AgPdNi alloys) of various compositions which are produced in an embodiment (Examples 1 to 7, Comparative Examples 1, 2 and 5 and Conventional Examples 1 to 4).

FIG. 4 shows the results of observation of the metal structures of the AgPdNi alloys produced in the embodiment (Examples 1 to 7 and Comparative Examples 1, 2 and 5 and the conventional alloys (SEM photographs).

TABLE 1

| | Composition (wt %) | | | | | Volume ratio of PdNi alloy phases | Thickness of alloy phase (μm)[*1] | |
|---|---|---|---|---|---|---|---|---|
| | Ag | Pd | Ni | In | Ni/Ag | (vol %) | Average | Maximum |
| Example 1 | 53 | 40 | 7 | — | 0.13 | 19.6 | 0.48 | 3.47 |
| Example 2 | 46 | 43 | 11 | — | 0.24 | 28.8 | 0.52 | 4.80 |
| Example 3 | 40 | 46 | 14 | — | 0.35 | 38.5 | 0.66 | 7.10 |
| Example 4 | 34 | 48 | 18 | — | 0.53 | 51.3 | 0.86 | 10.39 |
| Example 5 | 27 | 52 | 21 | — | 0.78 | 59.7 | 0.53 | 7.69 |
| Example 6 | 20 | 54 | 26 | — | 1.30 | 70.9 | 0.40 | 4.71 |
| Example 7 | 14 | 57 | 29 | — | 2.07 | 79.6 | 0.39 | 3.33 |
| Comparative Example 1 | 62 | 36 | 2 | — | 0.03 | 4.5 | 0.39 | 1.66 |
| Comparative Example 2 | 59 | 37 | 4 | — | 0.07 | 9.6 | 0.45 | 2.03 |
| Comparative Example 3 | 80 | 15 | 5 | — | 0.06 | 8.7 | 0.38 | 2.13 |
| Comparative Example 4 | 73 | 20 | 7 | — | 0.10 | 10.4 | 0.41 | 2.42 |
| Comparative Example 5 | 7 | 61 | 32 | — | 4.57 | 90.9 | 0.33 | 1.98 |
| Comparative Example 6 | 5 | 40 | 55 | — | 11.00 | —[*2] | —[*2] | —[*2] |
| Comparative Example 7 | 3 | 95 | 3 | — | 1.00 | —[*3] | —[*3] | —[*3] |
| Conventional Example 1 | 50 | 50 | — | — | — | — | — | — |
| Conventional Example 2 | 69 | 30 | 1 | — | 0.01 | — | — | — |
| Conventional Example 3 | 67 | 30 | 1 | 2 | 0.01 | — | — | — |
| Conventional Example 4 | 48 | 50 | 1 | 1 | 0.02 | — | — | — |

[*1]Thickness of PdNi alloy phase for alloys having PdNi alloy phase content of less than 50 vol %
Thickness of AgPd alloy phase for alloys having PdNi alloy phase content of 50 vol % or more
[*2]Measurement was impossible because processing of test material was not possible
[*3]Alloy phases were not precipitated, and measurement was impossible In the SEM photograph of FIG. 4, white or gray contrast phases are AgPd alloy phases. On the other hand, dark gray or black contrast phases are PdNi alloy phases. From FIG. 4, it is apparent that in Example 1 which is a AgPdNi alloy having a Ni content of evidently more than 5%, the ratio of PdNi alloy phases remarkably increases. The PdNi alloy phases become layered in appearance as the Ni content increases. The AgPdNi alloys of Examples 3 to 7 have metal structures with stacked structures of layered AgPd alloy phases and PdNi alloy phases. In the AgPdNi alloys of Comparative Examples 1 and 2 which have a low Ni content (5 mass % or less), PdNi alloy phases are generated, but the amount (volume ratio) of these alloy phases is lower as compared to the above-mentioned examples.

For conventional alloys, only AgPd alloy phases are observed in the AgPd alloy of Conventional Example 1 as a matter of course. Minute PdNi alloy phases are precipitated in the AgPd-based alloy of Conventional Example 2 which contains a very small amount of Ni. Further, the AgPd-based alloys of Conventional Examples 3 and 4 which contain a small amount of Ni and In have precipitates from these additive elements.

Figure 5:
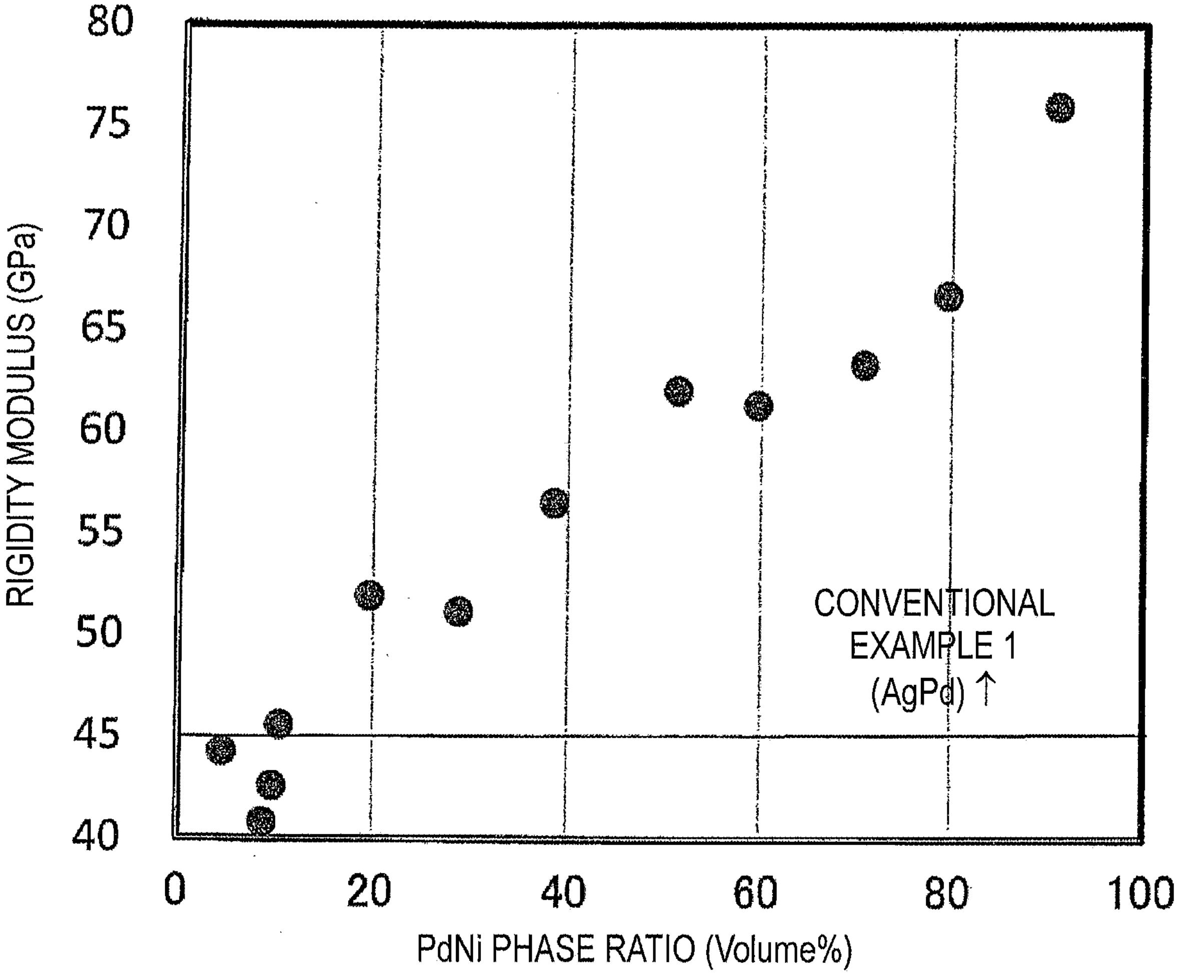
FIG. 5 shows a relationship between a volume ratio and a rigidity modulus of PdNi alloy phases for the AgPdNi alloys produced in the embodiment (Examples 1 to 7 and Comparative Examples 1 to 5).

Next, various electrically-conductive materials produced in the embodiment were subjected to a tensile test and hardness measurement for evaluating strength properties. In the evaluation test for strength properties, a plate-shaped sample (10 mm in width, 20 mm in length and 0.3 mm in thickness) subjected to full annealing (annealing condition: conventional example alloys were held at 700° C. for 1 hour, and Comparative Example and Example alloys were held at 900° C. for 1 hour), and then rolled at 50% was used. In the tensile test, a tensile test was conducted at a tension speed of 10 mm/min with a tensile tester (5966 manufactured by Instron Company), and the maximum stress, the 0.2% yield strength, the longitudinal elastic modulus and lateral elastic modulus were measured with a micro extensometer. The rigidity modulus was calculated from the values of the longitudinal elastic modulus and the lateral elastic modulus. The hardness measurement was performed with a Vickers hardness tester (HMV-G manufactured by Shimadzu Corporation), where the material was held with a test force of 2.942 N for 15 seconds. Table 2 shows the results of measuring the strength properties. FIG. 5 shows a relationship between the volume ratio and the rigidity modulus of PdNi alloy phases in the AgPdNi alloys of Examples 1 to 7 and Comparative Examples 1 to 5, which are obtained from the test results.

AgPd alloy (Conventional Example 1) and the AgPd-based alloys containing a small amount of additive elements (Conventional Examples 2 to 4), and these alloys each have a rigidity modulus of 50 GPa or less. That is, the method of the conventional art does not allow the rigidity modulus to be sufficiently improved.

On the other hand, the AgPdNi alloys of examples of the present invention (Examples 1 to 7) exhibit high value not only for the stress property but also for the rigidity modulus. The AgPdNi alloys of examples contain Ni in an amount of more than 5 mass %, and have a PdNi alloy phase volume ratio of 18 vol % or more. As is apparent from FIG. 5, the AgPdNi alloys of the examples have a rigidity modulus of 50 GPa or more, and higher strength properties as compared to the conventional examples. It is considered that the AgPdNi alloys of the examples in which the rigidity modulus is improved are hardly affected by shear stress from sliding, and contribute to improvement of wear resistance.

TABLE 2

| | Composition (wt %) | | | | | Volume ratio of PdNi alloy phases | Strength properties | | | |
|---|---|---|---|---|---|---|---|---|---|---|
| | Ag | Pd | Ni | In | Ni/Ag | (vol %) | Maximum stress (mpa) | 0.2% Yield strength (MPa) | Rigidity modulus (Gpa) | Hardness (Hv) |
| Example 1 | 53 | 40 | 7 | — | 0.13 | 19.6 | 710.3 | 665.7 | 52.0 | 205 |
| Example 2 | 46 | 43 | 11 | — | 0.24 | 28.8 | 793.4 | 771.8 | 51.2 | 220 |
| Example 3 | 40 | 46 | 14 | — | 0.35 | 38.5 | 846.4 | 802.7 | 56.6 | 245 |
| Example 4 | 34 | 48 | 18 | — | 0.53 | 51.3 | 882.8 | 818.4 | 62.1 | 246 |
| Example 5 | 27 | 52 | 21 | — | 0.78 | 59.7 | 934.9 | 879.7 | 61.4 | 263 |
| Example 6 | 20 | 54 | 26 | — | 1.30 | 70.9 | 1011.5 | 927.9 | 63.4 | 278 |
| Example 7 | 14 | 57 | 29 | — | 2.07 | 79.6 | 1079.2 | 963.8 | 66.7 | 308 |
| Comparative Example 1 | 62 | 36 | 2 | — | 0.03 | 4.5 | 606.0 | 569.4 | 44.3 | 178 |
| Comparative Example 2 | 59 | 37 | 4 | — | 0.07 | 9.6 | 624.6 | 581.4 | 42.6 | 184 |
| Comparative Example 3 | 80 | 15 | 5 | — — | 0.06 | 8.7 | 510.1 | 476.9 | 40.8 | 152 |
| Comparative Example 4 | 73 | 20 | 7 | — | 0.10 | 10.4 | 554.3 | 516.1 | 45.6 | 163 |
| Comparative Example 5 | 7 | 61 | 32 | — | 4.57 | 90.9 | 1108.6 | 1036.9 | 76.0 | 320 |
| Comparative Example 6 | 5 | 40 | 55 | — | 11.00 | —*1 | —*1 | —*1 | —*1 | —*1 |
| Comparative Example 7 | 3 | 95 | 3 | — | 1.00 | —*1 | —*1 | —*1 | —*1 | —*1 |
| Conventional Example 1 | 50 | 50 | — | — | — | — | 508.1 | 482.9 | 45.0 | 170 |
| Conventional Example 2 | 69 | 30 | 1 | — | 0.01 | — | 533.2 | 482.1 | 43.0 | 177 |
| Conventional Example 3 | 67 | 30 | 1 | 2 | 0.01 | — | 619.2 | 531.9 | 47.1 | 154 |
| Conventional Example 4 | 48 | 50 | 1 | 1 | 0.02 | — | 679.3 | 643.1 | 49.4 | 197 |

*1Measurement was cancelled because processing of test material was impossible or there were no alloy phases The results of conventional examples for the strength properties of the alloys show that the alloy of Conventional Example 2 in which a small amount of Ni is added to the AgPd alloy (Conventional Example 1) and the alloys of Conventional Examples 3 and 4 in which a small amount of In is further added to strengthen precipitation have higher values of maximum stress and yield strength as compared to Conventional Example 1. That is, it can be said that addition of a small amount of Ni (crystal grain refining) and addition of In etc. (precipitation strengthening) improved the strength properties of the AgPd alloy to some degree. However, there is no significant difference in rigidity modulus between the However, it is apparent from Table 2 and FIG. 5 that a certain restriction should be placed on the Ni content and the volume ratio of PdNi alloy phases in the AgPdNi alloy. That is, the AgPdNi alloys having a low Ni content (5 mass % or less) (Comparative Examples 1 to 3) have a low volume ratio of PdNi alloy phases and have no rigidity modulus improving effect. In addition, the alloy having a Ni content of 5% or more and Ag and Pd contents outside the specified ranges (Comparative Example 4) has a low volume ratio of PdNi alloy phases and have no rigidity modulus improving effect. On the other hand, the AgPdNi alloy of Comparative Example 5, which has a Ag content of less than 10 mass % and a PdNi alloy phase volume ratio of more than 80 vol %, became unable to plastically deform halfway in processing (at a processing ratio of 50%), resulting in breakage of the material. The alloy of Comparative Example 5 was poor in processability, and did not meet the spirit of the present invention.

Figure 6:
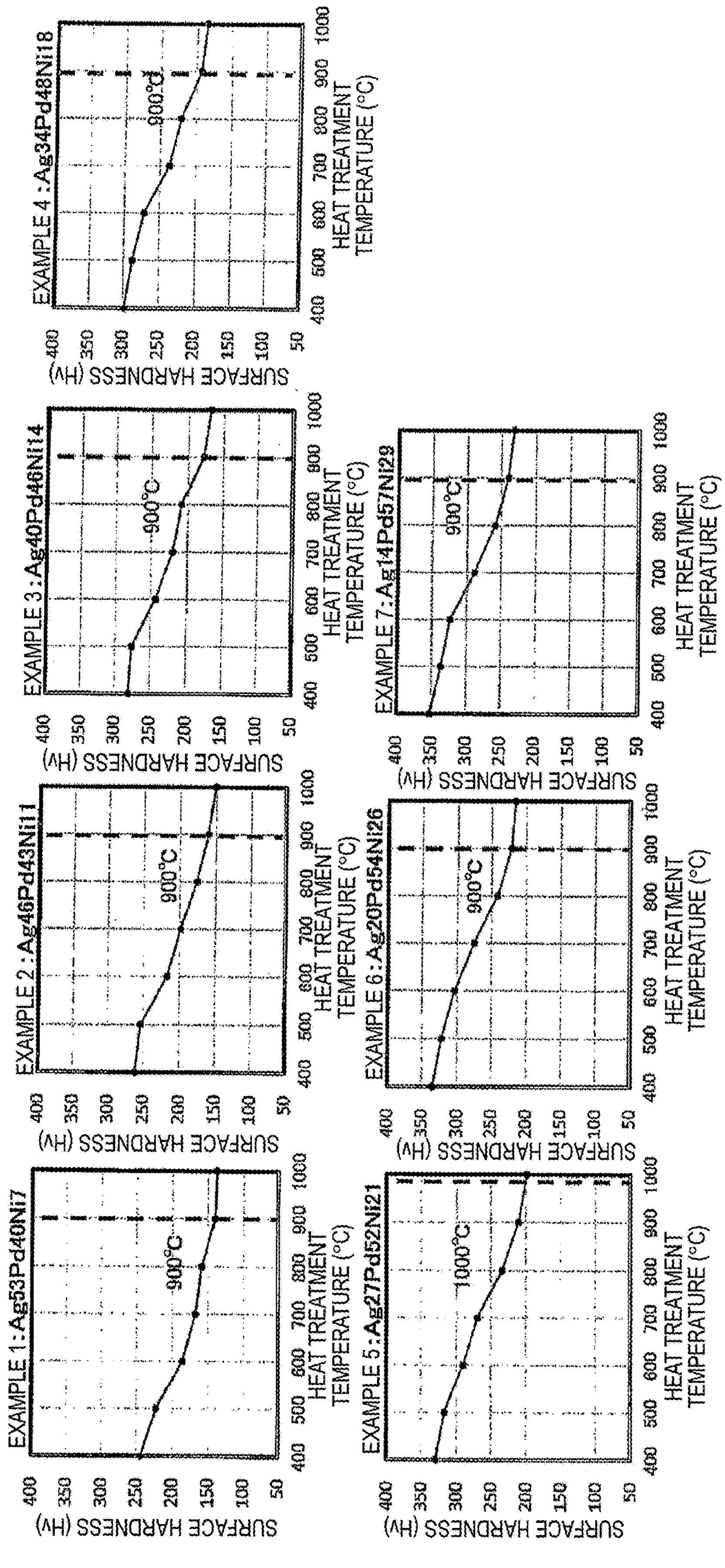
FIG. 6 shows a change in hardness when heat treatment is performed over a range of 400° C. to 1000° C. for the AgPdNi alloys produced in the embodiment (Examples 1 to 7).
Figure 7:
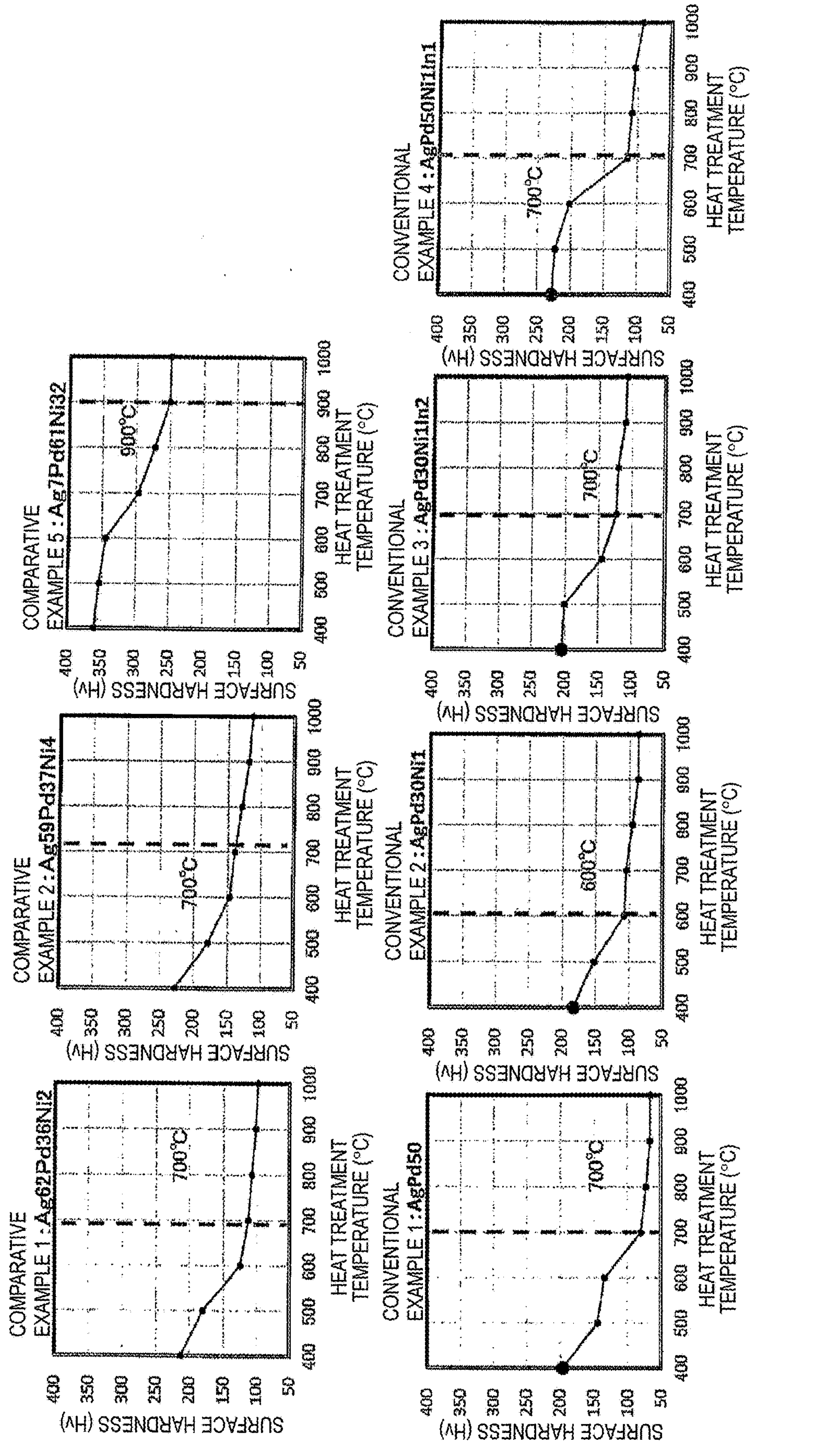
FIG. 7 shows a change in hardness when heat treatment is performed over a range of 400° C. to 1000° ° C. for the AgPdNi alloys and AgPd alloys produced in the embodiment (Comparative Examples 1, 2 and 5 and Conventional Examples 1 to 4).

Subsequently, a heat treatment test for evaluation of heat resistance was conducted on various electrically-conductive materials produced in the embodiment (Examples 1 to 7, Comparative Examples 1, 2 and 5 and Conventional Examples 1 to 4). In the heat treatment test, the same sample as that used in the tensile test was held at each of temperatures of 400° C., 500° C., 600° C., 700° C., 800° C., 900° C. and 1000° C. for 30 minutes, and the surface hardness was measured after the sample was held at each of the temperatures. FIGS. 6 and 7 show the results of the heat treatment test. These diagrams show a temperature at which the hardness of each alloy reached equilibrium where the slope of change in hardness was about 0.1.

From FIG. 7, it can be confirmed that the AgPd alloy and the AgPd-based alloys of Conventional Examples 1 to 3 are recrystallized with the hardness reaching equilibrium through heat treatment at 600° C. to 700° C. Like the alloys of conventional examples, the AgPdNi alloys of Comparative Examples 1 and 2 which have a low Ni content are recrystallized with the hardness reaching equilibrium through treatment at 600° ° C. to 700° ° C.

On the other hand, FIG. 6 shows that in Examples 1 to 7 where the volume ratio of PdNi alloy phases is 18 vol % or more, the hardness reaches equilibrium only through heat treatment at 900° C. to 1000° C. That is, the alloys of examples were each confirmed to have a higher recrystallization temperature as compared to conventional examples and comparative examples. A high crystallization temperature may make metal structures less likely to coarsen and soften even when exposed to friction heat from sliding or heat associated with discharge, resulting in contribution to improvement of wear resistance and heat resistance.

Figure 8:
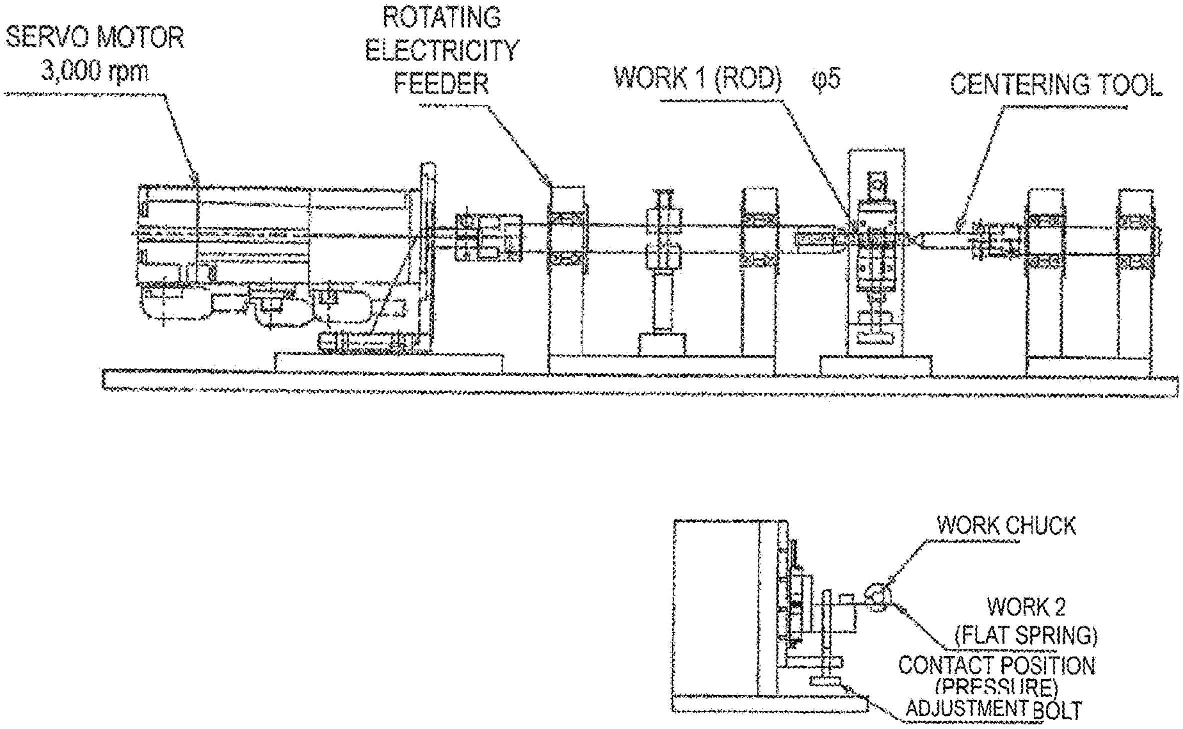
FIG. 8 is a schematic diagram of a slide tester for durability tests conducted in the embodiment.

The test materials of various electrically-conductive materials produced in the embodiment were subjected to a durability test using a slide tester. FIG. 8 shows a configuration of the slide tester used in the embodiment. This slide tester is aimed at reproducing a relationship between a brush and a commutator of a motor in a simulated manner. The reason why the durability test was conducted by use of a tester simulating a motor is that among applications intended by the present invention, use of the electrically-conductive material with a motor may place the electrically-conductive material under a larger electrical load as compared to other applications.

The tester of FIG. 8 has a mechanism in which a work 1 is a virtual commutator, which is fed with electricity to be rotated. The test is conducted with a flat spring-shaped virtual brush (work 2) pressed against the rotating work 1. In the durability test, a AgNi alloy is used for the virtual commutator (work 1), and the electrically-conductive material produced in the embodiment is used for the virtual brush (work 2). The test conditions are as follows, and both mechanical wear and wear from arc discharge occur.

Load current and voltage: 2.0 A-7.5 V

Rotation speed: 1500 rpm

Weight: 5 gf

Test time: 3 hours

Virtual commutator material: AgNi alloy (Ni: 10 mass %)

After the durability test, the detached test piece was etched with a Ag etchant to remove a transfer layer from the commutator material. The surface of the test piece was observed with a laser microscope, the depths of abraded portions were measured by a focus depth method, and the depth of the deepest abraded portion (maximum wear depth) and abraded cross-section areas (wear amount) were measured.

Figure 9:
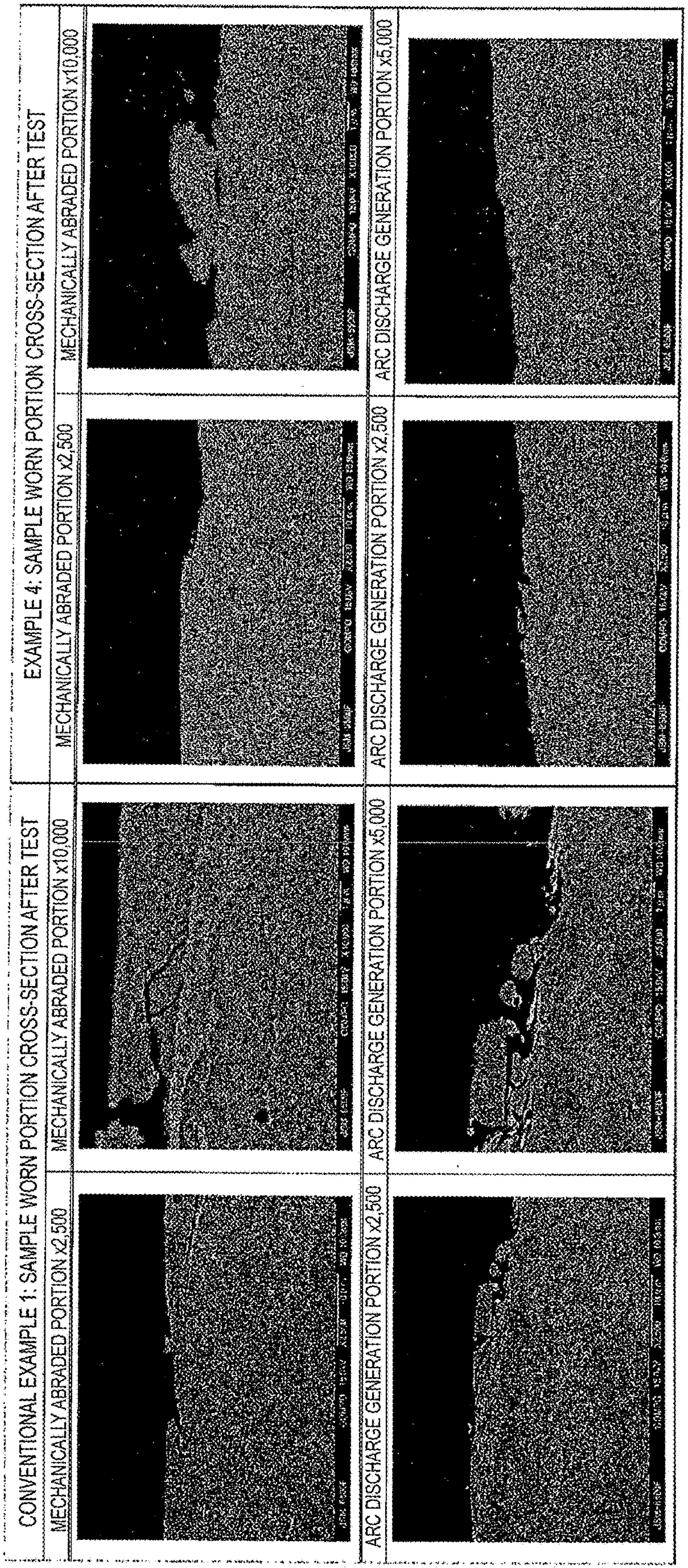
FIG. 9 shows SEM photographs showing cross-sectional shapes of worn portions after the durability tests conducted for examples and conventional examples in the embodiment.
Figure 10:
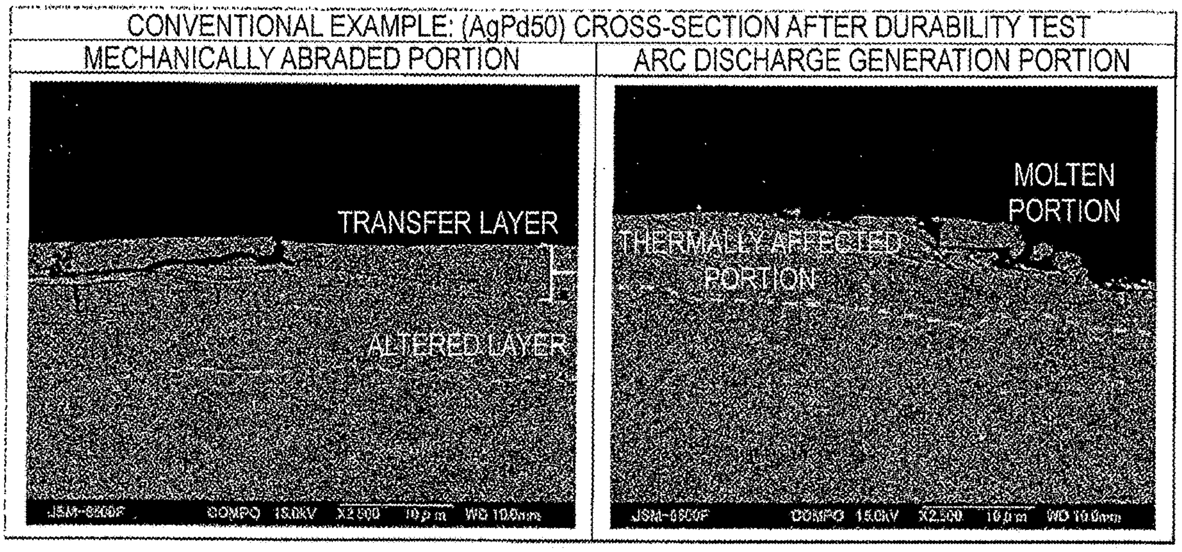
FIG. 10 shows SEM photographs showing cross-sectional shapes of worn portions of a AgPd alloy which is a conventional electrically-conductive material.

Table 3 shows the results of the durability test conducted in the embodiment. FIG. 9 shows SEM photographs in which the cross-sectional shapes of worn portions are compared between the alloys of Conventional Example 1 and Example 4 after the durability test.

TABLE 3

| | Composition | | | | | Volume ratio of PdNi alloy phases | Wear depth | Wear amount |
|---|---|---|---|---|---|---|---|---|
| | Ag | Pd | Ni | In | Ni/Ag | (vol %) | (μm) | ($μm^2$) |
| Example 1 | 53 | 40 | 7 | — | 0.13 | 19.6 | 4.44 | 829 |
| Example 2 | 46 | 43 | 11 | — | 0.24 | 28.8 | 3.84 | 689 |
| Example 3 | 40 | 46 | 14 | — | 0.35 | 38.5 | 3.05 | 515 |
| Example 4 | 34 | 48 | 18 | — | 0.53 | 51.3 | 2.72 | 556 |
| Example 5 | 27 | 52 | 21 | — | 0.78 | 59.7 | 4.40 | 716 |
| Example 6 | 20 | 54 | 26 | — | 1.30 | 70.9 | 3.96 | 693 |
| Example 7 | 14 | 57 | 29 | — | 2.07 | 79.6 | 3.67 | 730 |
| Comparative Example 1 | 62 | 36 | 2 | — | 0.03 | 4.5 | 7.21 | 2519 |
| Comparative Example 2 | 59 | 37 | 4 | —<br>— | 0.07 | 9.6 | 6.36 | 1896 |
| Comparative Example 3 | 80 | 15 | 5 | — | 0.06 | 8.7 | 7.87 | 2714 |
| Comparative Example 4 | 73 | 20 | 7 | — | 0.10 | 10.4 | 7.52 | 2633 |
| Comparative Example 5 | 7 | 61 | 32 | — | 4.57 | 90.9 | 3.71 | 700 |
| Comparative Example 6 | 5 | 40 | 55 | —<br>— | 11.00 | —*1<br>—*1 | —*1<br>—*1 | —*1<br>—*1 |
| Comparative Example 7 | 3 | 95 | 3 | — | 1.00 | —*1 | —*1 | —*1 |
| Conventional Example 1 | 50 | 50 | — | — | — | — | 5.94 | 1733 |
| Conventional Example 2 | 69 | 30 | 1 | — | 0.01 | —<br>— | 8.01 | 2755 |
| Conventional Example 3 | 67 | 30 | 1 | 2 | 0.01 | —<br>— | 6.01 | 1781 |
| Conventional Example 4 | 48 | 50 | 1 | 1 | 0.02 | — | 5.02 | 1054 |

*1 Measurement was cancelled because processing of test material was impossible or there were no alloy phases From Table 3, it was confirmed that when the AgPdNi alloy has the added amount of Ni of more than 5 mass % and a PdNi alloy phase volume ratio of 18 vol % or more while having appropriate Ag and Pd contents, it is possible to obtain an electrically-conductive material having a lower wear amount and wear depth as compared to the conventional art. The wear depth and the wear amount tend to decrease as the volume ratio of PdNi alloy phases increases. For evaluation of wear resistance, the wear amount and the wear depth should be comprehensively examined, and alloys excellent in balance between the wear amount and the wear depth and particularly excellent in wear resistance are those of Examples 3 and 4. These results indicate that with regard to wear resistance, the volume ratio of PdNi alloy phases is particularly preferably about 35% or more and 55% or less.

In Comparative Example 5 where the ratio of PdNi alloy phases was more than 80 vol %, the wear amount was lower as compared to conventional examples, but there was a high inclination for abrasive wear in which the counterpart (AgNi alloy: commutator) was scraped. Thus, when the ratio of PdNi alloy phases is excessively high, the contact as a whole lacks balance in wear.

From FIG. 9, it is apparent that a cross-section of the AgPd alloy of Conventional Example 1 has an altered layer affected by sliding stress is present within a range of about 10 μm from the surface layer in a mechanically abraded portion. On the other hand, it can be confirmed that in the AgPdNi alloy of Example 6, the thickness of the altered layer is limited within a range of about 3 μm from the surface layer. The result of the comparison shows that the AgPdNi alloy of the example is less likely to plastically deform even when placed under actual shear stress from sliding. Further, for the arc discharge generation portion, the AgPd alloy of Conventional Example 1 is intensely melted, so that surface structures can be confirmed to be thermally affected, while the AgPdNi alloy of Example 6 is melted over a narrow range, and is considered to have resistance to arc discharge.

INDUSTRIAL APPLICABILITY

As described above, the present inventive electrically-conductive material has higher durability as compared to conventional AgPd alloys and AgPd alloys containing a very small amount of elements. The present invention is useful for electrodes and contact materials to be used for slide switches and variable resistors, in addition to brushes of DC motors, slip rings and the like.

In particular, when the present inventive electrically-conductive material is applied to brushes of micro DC motors, the present invention is useful for motors having a stall current of 1.0 A or more. When the stall current is 1.0 A or more, arc discharge is generated between contacts, and therefore the AgPd alloy described above as a prior art is heavily worn, resulting in reduction of the life of the brush. The present inventive electrically-conductive material has high resistance to not only mechanical wear but also arc discharge, and therefore can be hoped to extend the life of the motor as compared to conventional AgPd alloys. Thus, when the electrically-conductive material is used as a constituent material of a brush of a motor having stall current of 1.0 A or more, extension of the life of the motor can be expected.

The invention claimed is:

1. A DC motor comprising:

a rotating shaft;

a commutator provided on a periphery of the rotating shaft; and a brush contacting the commutator to supply a current, wherein the brush is formed of a first contact material at least at a contact surface with the commutator, the first contact material is formed of an electrically-conductive material comprising Ag in an amount of 10 mass % or more and 70 mass % or less, Pd in an amount of 30 mass % or more and 90 mass % or less, Ni in an amount of 11 mass % or more and 45 mass % or less, and inevitable impurities, a ratio of a Ni content (mass %) to a Ag content (mass %) (Ni (mass %)/Ag (mass %)) in the electrically-conductive material is 0.13 or more and 5.0 or less, and metal structures of the electrically-conductive material have a AgPd alloy phase and a PdNi alloy phase, and a volume ratio of the PdNi alloy phase is 18 vol % or more and 80 vol % or less.

2. The DC motor according to claim 1, wherein the AgPd alloy phase comprises Ag and Pd as a balance in an amount of 30 mass % or more and 80 mass % or less, Ni in an amount of 0 mass % or more and 1 mass % or less, and inevitable impurities, the PdNi alloy phase comprises Pd and Ni as a balance in an amount of 40 mass % or more and 90 mass % or less, Ag in an amount of 0 mass % or more and 5 mass % or less, and inevitable impurities.

3. The DC motor according to claim 1, wherein the volume ratio of the PdNi alloy phase is 18 vol % or more and less than 50 vol %, and a thickness of the PdNi alloy phase is in a range of 0.01 μm or more and 20 μm or less.

4. The DC motor according to claim 1, wherein the volume ratio of the PdNi alloy phase is 50 vol % or more and 80 vol % or less, and the thickness of the AgPd alloy phase is in the range of 0.01 μm or more and 20 μm or less.

5. The DC motor according to claim 1, wherein at least a contact surface of the commutator with the brush is formed of a second contact material, and the second contact material includes a Ag—Ni alloy, a Ag—Cu—Ni alloy or a Ag—Cu—Ni—Zn alloy.

* * * * *